(12) United States Patent
Sun et al.

(10) Patent No.: US 9,443,245 B2
(45) Date of Patent: Sep. 13, 2016

(54) OPINION SEARCH ENGINE

(75) Inventors: Jian-Tao Sun, Beijing (CN); Xiaochuan Ni, Beijing (CN); Peng Xu, Beijing (CN); Gang Wang, Beijing (CN); Ke Tang, Beijing (CN); Zheng Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1316 days.

(21) Appl. No.: 12/568,702

(22) Filed: Sep. 29, 2009

(65) Prior Publication Data

US 2011/0078157 A1  Mar. 31, 2011

(51) Int. Cl.
*G06F 17/30* (2006.01)
*G06F 17/21* (2006.01)
*G06Q 30/02* (2012.01)
*G06F 17/27* (2006.01)

(52) U.S. Cl.
CPC .......... *G06Q 30/02* (2013.01); *G06F 17/2785* (2013.01); *G06F 17/3071* (2013.01); *G06F 17/30616* (2013.01); *G06F 17/30722* (2013.01); *G06F 17/30867* (2013.01)

(58) Field of Classification Search
CPC ................................................ G06F 17/30702
USPC ....................................................... 707/776
See application file for complete search history.

(56) References Cited

U.S. PATENT DOCUMENTS

| | | | |
|---|---|---|---|
| 7,395,259 B2 | 7/2008 | Bailey et al. | |
| 7,620,651 B2 * | 11/2009 | Chea ................. | G06F 17/30719 379/92.01 |
| 7,974,984 B2 * | 7/2011 | Reuther ....................... | 707/777 |
| 8,001,003 B1 * | 8/2011 | Robinson et al. ......... | 705/14.53 |
| 8,108,255 B1 * | 1/2012 | Robinson ............... | G06Q 30/02 705/14.44 |
| 8,260,771 B1 * | 9/2012 | Ortega ............. | G06F 17/30997 707/723 |
| 2002/0049738 A1 * | 4/2002 | Epstein ........................... | 707/1 |
| 2006/0143068 A1 | 6/2006 | Calabria | |
| 2006/0143158 A1 * | 6/2006 | Ruhl ................ | G06F 17/30864 |
| 2006/0200342 A1 * | 9/2006 | Corston-Oliver ..... | G06F 17/274 704/10 |
| 2006/0282336 A1 * | 12/2006 | Huang .............. | G06F 17/30864 705/26.61 |
| 2007/0214131 A1 * | 9/2007 | Cucerzan et al. ................ | 707/5 |
| 2007/0219963 A1 * | 9/2007 | Soroca .............................. | 707/3 |
| 2007/0265803 A1 * | 11/2007 | Kotsovinos et al. ......... | 702/182 |
| 2008/0109232 A1 | 5/2008 | Musgrove et al. | |
| 2008/0215571 A1 | 9/2008 | Huang et al. | |
| 2008/0215607 A1 * | 9/2008 | Kaushansky .......... | G06Q 30/02 |
| 2009/0083096 A1 * | 3/2009 | Cao ........................ | G06Q 10/00 705/7.32 |

(Continued)

OTHER PUBLICATIONS

Hu, Mining Opinion Features in Customer Reviews, 2004, pp. 755-760.*

(Continued)

*Primary Examiner* — Albert Phillips, III
(74) *Attorney, Agent, or Firm* — Sandy Swain; Micky Minhas (57) ABSTRACT

A computer-readable storage medium having stored thereon computer-executable instructions which, when executed by a computer, cause the computer to implement an opinion search engine. The instructions to implement an opinion search engine cause the computer to collect opinion data about one or more objects from the Internet, extract metadata about the opinion data from the opinion data, remove duplicate metadata from the metadata to generate a resulting metadata, categorize the resulting metadata for similar objects according to one or more taxonomies from one or more websites on the Internet and rank the similar objects based on the categorized metadata.

19 Claims, 4 Drawing Sheets

(56) References Cited

U.S. PATENT DOCUMENTS

| | | | | |
|---|---|---|---|---|
| 2009/0164929 | A1* | 6/2009 | Chen | G06F 17/30867 715/769 |
| 2009/0192808 | A1* | 7/2009 | Sela | G06Q 30/02 705/1.1 |
| 2009/0265307 | A1* | 10/2009 | Reisman | G06F 17/30873 |
| 2011/0035378 | A1* | 2/2011 | Scholz et al. | 707/740 |

OTHER PUBLICATIONS

Kules, Categorizing Web Search Results into Meaningful and Stable Categories Using Fast-Feature Techniques, 2006, pp. 210-219.*

Schafer, Meta-recommendation Systems: User-controlled Integration of Diverse Recommendations, 2002, pp. 43-51.*

Dave, Mining the Peanut Gallery: Opinion Extraction and Semantic Classification of Product Reviews, 2003, pp. 519-528.*

Miao, Amazing: A sentiment mining and retrieval system, Sep. 23, 2008, pp. 7192-7198.*

Jin, OpinionMiner: A Novel Machine Learning System for Web Opinion Mining and Extraction, Jun. 28, 2009, pp. 1195-1204.*

Lee, Needs-Based Analysis of Online Customer Reviews, 2007, pp. 311-317.*

Jindal, Review Spam Detection, 2007, pp. 1189-1190.*

Sakharvo, Finite State Machines, 2005, pp. 1-3.*

Feiguina, Query-Based Summarization of Customer Reviews, 2007, pp. 452-463.*

Iskold, Alex, "Watch Out Google, Vertical Search is Ramping Up!", Retrieved at <<http://www.readwriteweb.com/archives/vertical_search.php>, Sep. 29 2006, pp. 4.

Hearst, et al.,"What Should Blog Search Look Like?",Retrieved at <<http://research.microsoft.com/en-us/um/people/sdumais/ssm15p-hearst.pdf>>, 2008, pp. 95-98.

Kritikopoulos , et al., "Blogrank: Ranking Weblogs Based on Connectivity and Similarity Features",Retrieved at <<http://arxiv.org/ftp/arxiv/papers/0903/0903.4035.pdf>>, vol. 198, Article No. 8, 2006,pp. 1-9.

Ramakrishnan , et al.,"Toward a PeopleWeb",Retrieved at <<http://ieeexplore.ieee.org/stamp/stamp.jsp? tp=&arnumber=4292015&isnumber=4291993>>,Aug. 2007, vol. 40, Issue 8, pp. 63-72.

Enge ,Eric, "Will Universal Search Mean Universal Domination?", Retrieved at <<http://searchenginewatch.com/3625897>>, May 17, 2007,p. 2.

* cited by examiner

OPINION SEARCH ENGINE

BACKGROUND

Internet users (reviewers) use various web-based forums such as blogs and review websites to express their opinion about any topic of interest such books, hotels, consumer products, political policy and the like. These opinions about various topics of interest may be referred to as opinion data. Opinion data is typically used to help consumers make an informed purchase decision about an item that they may wish to purchase based on the opinions of other consumers. Opinion data is also used to help companies learn more about how their customers rate their products, customer sentiment for their products and customer satisfaction for their products. Since anyone can add an opinion about anything on the Internet, opinion data is voluminous and includes a plethora of diverse topics, which makes it difficult for users to locate relevant opinions related to their topic of interest.

SUMMARY

Described herein are implementations of various technologies for implementing an opinion search engine. In one implementation, a computer application may access each webpage available on the Internet and determine whether each webpage contains opinion data. If the webpage contains opinion data, the computer application may store the webpage on a first database. The computer application may then extract information pertaining to the opinion data from each webpage stored on the first database. While extracting the information pertaining to the opinion data, the computer application may determine whether the information corresponds to a particular category of information or an information data type. The computer application may then store the information pertaining to the opinion data in a second database according to the information's particular category. In this manner, the second database may be structured according to the properties of the information.

The computer application may then remove duplicative information and group similar information together. In addition to removing duplicative information from the second database and group similar information together, the computer application may determine a taxonomy for the information in the second database. The taxonomy may refer to a classification scheme such that the information in the second database may be organized in a hierarchal structure. In order to determine an appropriate taxonomy for all of the information in the second database, the computer application may examine the taxonomies of each webpage listed in the second database. In one implementation, the computer application may leverage each web page's link paths and site map information to determine the appropriate taxonomy for all of the information in the second database. After determining the appropriate taxonomies, the computer application may organize the information pertaining to the opinion data in the second database according to the appropriate taxonomy. The computer application may then use the organized information in the second database to rank products, product categories, opinions, and other opinion-related subject matter on the Internet.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to implementing an opinion search engine. Various techniques for implementing an opinion search engine will be described in more detail with reference to FIGS. 1-4.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
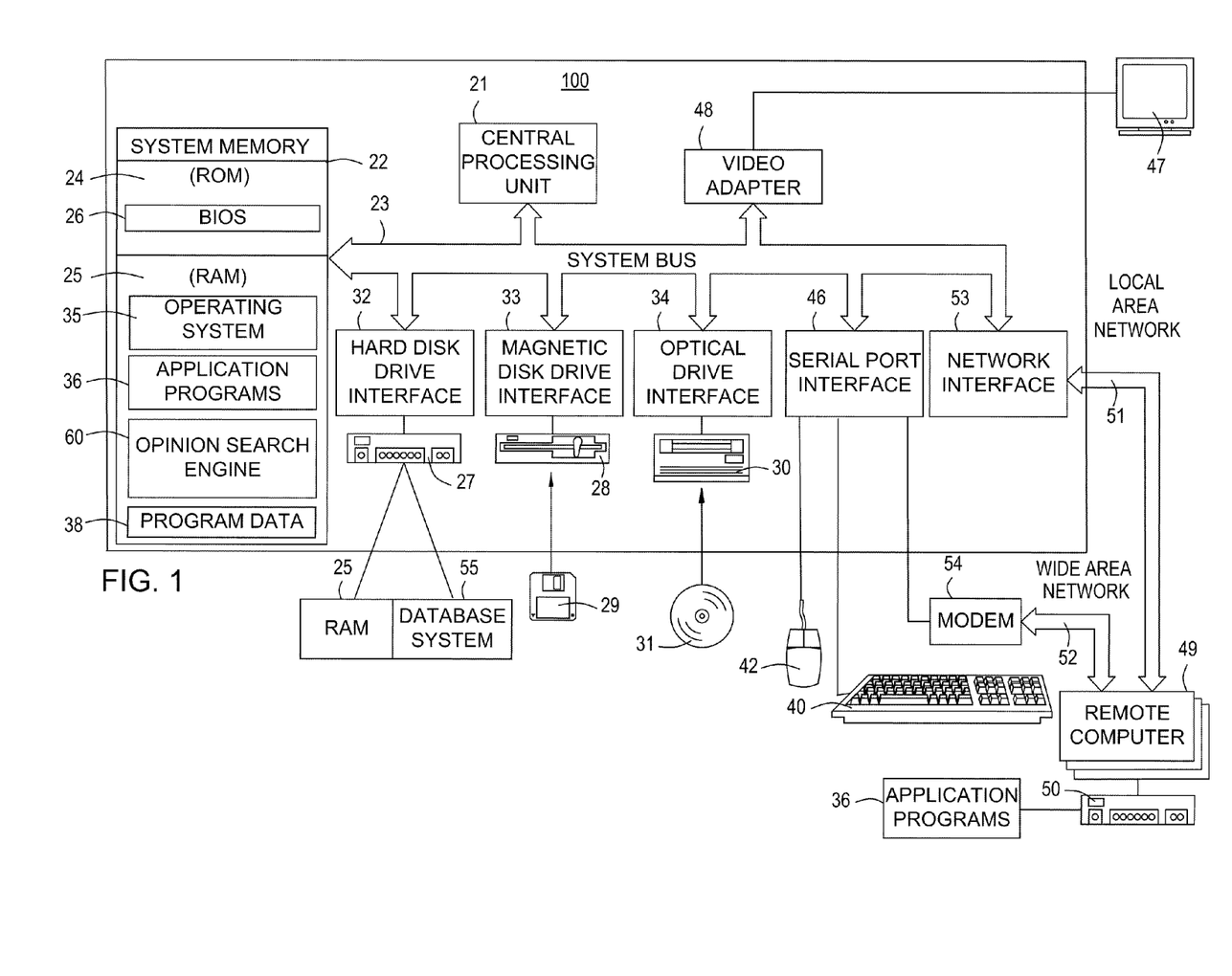
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, an opinion search engine 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The opinion search engine 60 will be described in more detail with reference to FIG. 2 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
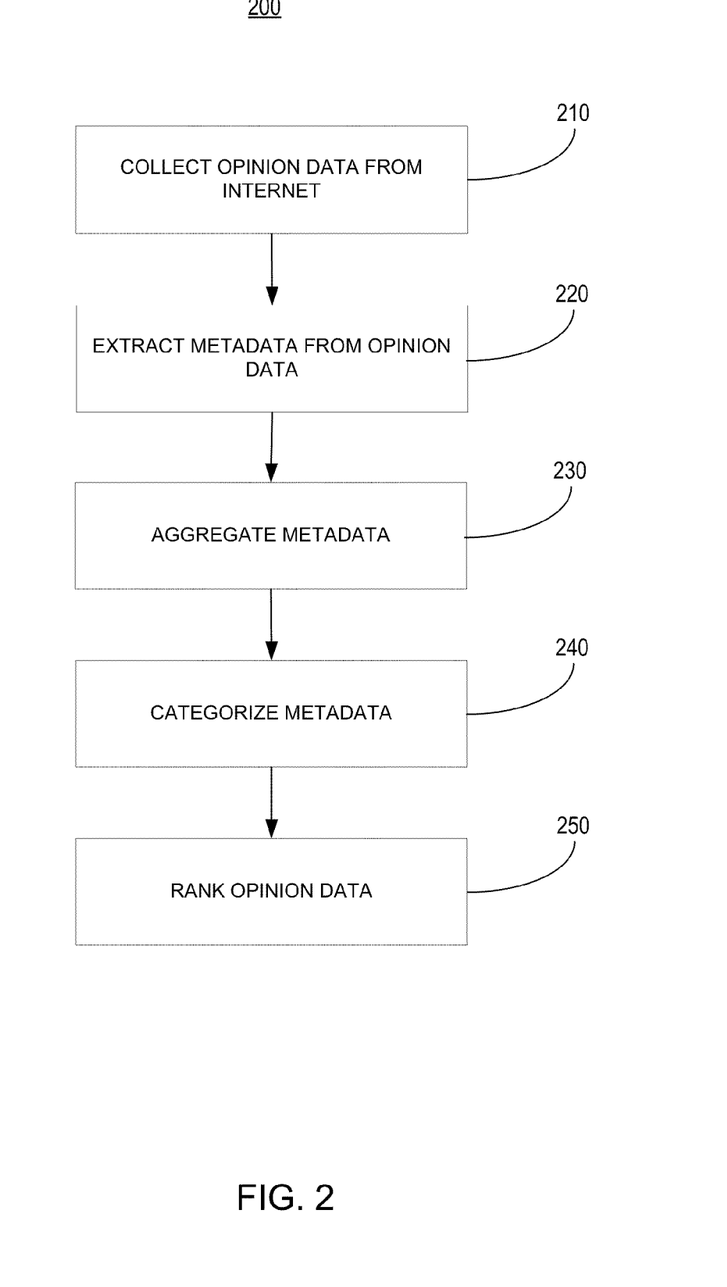
FIG. 2 illustrates a flow diagram of a method for implementing an opinion search engine in accordance with one or more implementations of various techniques described herein.

FIG. 2 illustrates a flow diagram of a method for implementing an opinion search engine in accordance with one or more implementations of various techniques described herein. The following description of flow diagram 200 is made with reference to computing system 100 of FIG. 1 in accordance with one or more implementations of various techniques described herein. It should be understood that while the operational flow diagram 200 indicates a particular order of execution of the operations, in some implementations, certain portions of the operations might be executed in a different order. In one implementation, the method for implementing an opinion search engine may be performed by the opinion search engine 60.

At step 210, the opinion search engine 60 may collect opinion data from the Internet. The opinion data may include reviews or ratings pertaining to an object or subject matter of interest that may be displayed on the Internet. In one implementation, the opinion search engine 60 may first access every website and web page available on the Internet. The web pages available on the Internet may include blogs, newsgroups, forums and other forms of web-based information that may be accessible by the opinion search engine 60 via the Internet. After accessing each web page, the opinion search engine 60 may then determine whether the web page contains opinion data about an object. Opinion data about the objects may relate to reviews about consumer products, vacation locations or any other subject matter that may be of interest to a user. Upon determining that the web page includes opinion data, the opinion search engine 60 may store the corresponding web page and the information on the web page in an opinion database. The web pages and the information on the web pages stored on the opinion database include a subset of the web pages available on the Internet. In one implementation, the opinion database may be stored on a server such that the server may be accessible via the Internet. The opinion database may be stored on the database system 55 as described in FIG. 1.

In one implementation, in order to determine whether the web page contains opinion data, the opinion search engine 60 may check how many opinion words are contained in a web page. If the number of opinion words exceeds a predefined threshold, the opinion search engine 60 may describe the web page as having opinion data. Opinion words may include words that are usually used to express opinions (e.g., "good", "exciting" and "bad"). In one implementation, the opinion words may be manually provided by both human editors and machine learning algorithms. In practical applications, machines may be used to generate opinion words and then human editors may manually check or filter them in order to ensure the quality of the opinion words. Although web pages having opinion data have been described as being identified by determining how many opinion words are contained in the web pages, it should be noted that in other implementations various algorithms may be used to determine whether the opinion data is contained on the web pages.

In another implementation, the opinion search engine 60 may collect only targeted or specific opinion data from the Internet as opposed to all of the opinion data available on the Internet. In this implementation, a user may specify a particular product or product category (e.g., object) that may be of interest to the user. After receiving the specified product or product category, the opinion search engine 60 may access all of web pages that are available on the Internet and determine whether each web page contains opinion data related to the specified product or product category. Upon determining that the web page includes opinion data related to the specified product or product category, the opinion search engine 60 may store the corresponding web page and the information on the web page in the opinion database. In one implementation, step 210 may be executed by an opinion data crawler module that may be part of the opinion search engine 60. Although the opinion data has been described as being related to products or product categories, it should be understood that throughout this document the opinion data may refer to any opinion about any subject matter.

At step 220, the opinion search engine 60 may extract metadata from each webpage stored on the opinion database. The metadata may include information pertaining to the opinion data on the webpage stored on the opinion database. In one implementation, the information pertaining to the opinion data may include a date and time in which the opinion was posted on the webpage, a name or user identification of the user who posted the opinion, a product pertaining to the opinion, a product brand pertaining to the opinion, the text of the opinion, a sentiment polarity of the opinion or any other subject matter pertaining to the opinion. The opinion search engine 60 may determine a product's brand name by using a finite state machine.

In order to determine a product's brand name using a finite state machine, the opinion search engine 60 may use a word breaker to generate or create a sequence of terms contained in a product name as it is listed on a web page. Given a finite state machine having states and transitions represented by terms and grammar, and an input term sequence (e.g., product) that is not accepted by the finite state machine, the opinion search engine 60 may use an algorithm to find a minimal set of modifications that may be made to the finite state machine such that the input term sequence is acceptable. In one implementation, the opinion search engine 60 may run the algorithm iteratively and update the finite state machine such that it contains the input term sequence. The opinion search engine 60 may update the finite state machine through induction such that the transition represented by the terms may be changed into transitions represented by grammar, and new transitions and new states may be added to the finite state machine if they were not previously represented on the finite state machine. The output of algorithm is a finite state machine consisting of multiple state sequences such that each state sequence is a product name. The opinion search engine 60 may then use the updated finite state machine to predict if an input term sequence corresponds with a brand name.

Upon extracting the metadata from the web pages in the opinion database, the opinion search engine 60 may determine whether the metadata corresponds to a particular data property of a product ontology. The data properties of a product ontology may represent categories or definitions for the metadata. In one implementation, the opinion search engine 60 may receive a list of key words for each data property or category. The opinion search engine 60 may then use a fuzzy match algorithm to locate the key words that may be listed in the metadata and assign the unstructured metadata to a corresponding data property. The product ontology may provide an efficient mechanism to build an association among opinion data and their corresponding properties. In one implementation, the product ontology may be based on a universal ontology model such that the raw data on any data source, such as a webpage, may be mapped to a corresponding data property. In this manner, the product ontology may provide a scalable architecture such that information from various websites and data sources may be more easily integrated by the opinion search engine 60.

In one implementation, the product ontology may be defined by summarizing the details of product specifications published by manufacturer websites, shopping sites, review sites and other related data sources. The ontology may be defined in OWL, a standard ontology language published by the World Wide Web Consortium (W3C). OWL may facilitate a greater machine interpretability of Web content than that supported by Extensible Markup Language (XML), Resource Description Framework (RDF), RDF Schema (RDFS), DARPA Agent Markup Language (DAML) by providing additional vocabulary along with a formal semantics. Depending on the extensibility of OWL, the product ontology definition may be extended with additional ontology, property and relationship definition.

After identifying the keywords related to the metadata on each webpage, the opinion search engine 60 may store the metadata of the opinion data in an opinion metadata database. In one implementation, the opinion metadata database may be structured in a manner such that the information pertaining to the opinion data may be easily queried. The opinion metadata database may be structured according to the data properties of the product ontology. For example, the metadata database may store information pertaining to the opinion data in a spreadsheet such that each column of the spreadsheet may define a different property of the opinion data. In one implementation, the text information reciting a user's review or opinion of a product may not be stored in a structured format since the text provided by each user may differ greatly and may not be easily queried.

At step 230, the opinion search engine 60 may aggregate the opinion data in the opinion metadata database. As such, the opinion search engine 60 may identify and group all of the opinion data obtained from various web pages on the Internet pertaining to the same subject matter. In order to aggregate the opinion data, the opinion search engine 60 may determine whether two or more opinion data in the opinion metadata database are duplicative. In one implementation, duplicative opinion data may include instances when a single user writes the same review for a single product on two different web pages. Upon determining that opinion data are duplicative, the opinion search engine 60 may remove the duplicative opinion data from the opinion metadata database.

In aggregating the opinion data in the opinion metadata database, the opinion search engine 60 may determine whether the opinion data pertains to the similar subject matter or objects. For instance, a first user may add opinion review to a web page about a certain product. Here, the first user may refer to the certain product according to its specific name which may include the manufacturer's name and the product's version number. A second user may also add opinion review about the same product on the same or a different web page. The second user, however, may refer to the certain product according to its generic name without reference to the manufacturer's name or the product's version number. The opinion search engine 60, may determine that these two reviews are similar because they pertain to the same product or object. As such, the opinion search engine 60 may combine or aggregate the metadata related to the two similar reviews.

At step 240, the opinion search engine 60 may categorize or organize the opinion data in the aggregated opinion metadata database according to a taxonomy of hierarchal categories. In one implementation, the opinion search engine 60 may determine the taxonomy of hierarchal categories by evaluating the category taxonomies of the web pages from which the opinion data in the opinion database may have been obtained. In evaluating the category taxonomies of each web page, the opinion search engine 60 may leverage each web page's link paths and site map information that may be hidden in source sites. By leveraging each web page's link paths and site map information, the opinion search engine 60 may reduce and consolidate the taxonomy of hierarchal categories of each web page and resolve the inconsistencies between the different category taxonomies of different web pages. In other words, the opinion search engine 60 may create a new taxonomy based on the consolidated taxonomy of hierarchal categories from the different web pages. In one implementation, after determining the new taxonomy, the opinion search engine 60 may modify the opinion metadata database such that it is organized according to the new taxonomy. This newly organized opinion metadata database may be referred to as a categorized opinion database. For example, on website "A," there may be a "vehicle" category that contains a list of car model manufactures like "BMW", "Toyota," etc. as sub-categories. On website "B," there may be an "automotive" category that contains sub-categories that are similar with those of the "vehicle" category of website "A." The opinion search engine 60 may then assume that "vehicle" and "automotive" most likely correspond with a similar concept, thereby resolving the inconsistencies between different category taxonomies on different web pages.

At step 250, the opinion search engine 60 may rank or recommend products, product categories, and users' opinions based on the categorized opinion data as determined in step 240. In addition to ranking or recommending product categories and users' opinions, the opinion search engine 60 may display the product categories and users' opinions according to various aspects of the corresponding categorized opinion data. A few of the rank, recommendation and display features of the opinion search engine 60 are described below.

Ranking Products Based on Hotness Score

In one implementation, the opinion search engine 60 may rank the products in the categorized opinion database based on a hotness score. The score may be determined by combining different information such as a query log, a click-through log, review information, reviewer information, and item selling information. The query log, click-through log, review information, reviewer information, and item selling information may all be available to the opinion search engine 60 on the categorized opinion database as described in step 240.

The query log may refer to a number of query requests by one or more users on the Internet. In one implementation, the query log may indicate the interest level in one or more particular items. The query log may be available from an Internet search engine.

The click-through log may describe the webpage links that a user may have clicked while surfing the Internet. For instance, after receiving Internet search results for a product of interest, the user may not click a link for each and every product that was returned as a search result. In contrast, the user may only click the search results that may be related to the products, services or opinions that may be of interest to him. The search results clicked by the user may be recorded on the click-through log.

The review information may include the number of reviews or opinions that may exist for each product of interest and a trend of the number of reviews for each product of interest. The opinion search engine 60 may determine the trend of the number of reviews based the frequency of the addition of new reviews over a period of time. For example, if two opinions were added in month 1 for product X and ten opinions were added in month 2 for product X, the opinion search engine 60 may determine that the trend is rising because more reviews are being added with respect to time. The opinion search engine 60 may also distinguish the trend data according to positive opinion trends, negative opinion trends and the like.

The reviewer information may describe the user who adds opinions on the Internet. The reviewer information may include the number of reviewers commenting or adding an opinion for a product, the demographic information pertaining to the user (e.g., gender, age and location coverage of user) and the like.

The item selling information may describe the number of products that have been sold to or purchased by the users. The opinion search engine 60 may then determine a hotness score for the product reviewed by the users based on the query log, click-through log, review information, reviewer information and item selling information. Based on the hotness score for the various products reviewed by the users, the opinion search engine 60 may also rank product categories according to a hotness score that may be computed based on the hotness scores of all of the products in each product category. In one implementation, the opinion search engine 60 may compute the hotness scores for each product in real-time while the user is online. In other implementations, the opinion search engine 60 may compute the hotness scores for each product while the user is offline using the information previously obtained from the users on the Internet.

Rank Products by User Opinion

In yet another implementation, the opinion search engine 60 may rank the products according to the users' opinions or an opinion score about the product. In order to rank the products according to the users' opinions about the product, the opinion search engine 60 may evaluate the ratings and the ranking of various products as provided on various websites. For instance, on some shopping websites, products may be ranked based on average rating scores provided by Internet users. Since each shopping website may employ its own rating system, the opinion search engine 60 may combine the ratings for a product from each website to determine a unified opinion score for each product.

The opinion search engine 60 may calculate the unified opinion score based on a total number of users writing a review about a product, the rating score of each user if a rating score is available, whether the review is positive or negative if a rating score is unavailable, an authority estimate for each user, an authority estimate for each website containing user reviews and the like. In one implementation, the opinion search engine 60 estimate the authority of each user based on whether the user is an editor on the website, a product specialist or the like.

In another implementation, various websites may provide a rating for each user. In this case, the opinion search engine 60 may estimate the authority of each user based on the rating provided by the website. If the opinion search engine 60 determines that an opinion has been added from a user with a higher authority, the opinion search engine 60 may give that user's opinion more weight in determining the unified opinion score. In addition to estimating the authority of each user, the opinion search engine 60 may also estimate the authority of each website containing user opinions.

The opinion search engine 60 may also evaluate the review provided by a user in order to calculate an opinion score. Here, the opinion search engine 60 may analyze the review provided by the user and determine whether the review includes characteristics that indicate that it is a positive review about the product or a negative review about the product.

Rank Products Based on a Recommendation Score

The opinion search engine 60 may also rank the products according to a recommendation score. The opinion search engine 60 may calculate the recommendation score based on the volume of the opinions or reviews provided for a particular product and the percentage of positive opinions or reviews related to the particular product. In this manner, the opinion search engine 60 may rank each product according to its recommendation score. The recommendation score may be based on whether the total number of users who added a positive opinion on the Internet about the particular product is greater than the number of users who added a negative opinion about the particular product. For example, suppose there are 100 reviews for product X and 10 reviews for product Y. 49 percent of the reviews for product X are positive, and 50 percent of the reviews for product Y are positive. The opinion search engine 60 may determine the recommendation score based on the number of users who wrote a positive review as opposed to the percentage of the users who had a positive review for a product. In the preceding example, product X may have a higher recommendation score as compared to product Y because product X had a total of 49 positive reviews while product Y only had a total of 5 positive reviews.

Displaying Products by Dynamic Groups

The opinion search engine 60 may display products according to dynamic groups. Here, the opinion search engine 60 may filter the products according to the dynamic groups. The opinion search engine 60 may filter products according to a product brand, a manufacturer of the product, or features of the product. In one implementation, the dynamic groups may be defined by a user by specifying to the opinion search engine 60 a percentage of positive reviews for a feature of the product. For example, a product may include features such as a user manual, noise, resolution and weight. The opinion search engine 60 may display a window to the user such that the user may specify how to filter the products in the categorized opinion database. The user may specify a percentage of positive reviews for each feature of the product. In one implementation, the user may be interested in a product having high ratings for its user manual. As such, the user may specify to the opinion search engine 60 that the percentage of positive reviews pertaining to the product's user manual will be 70% or greater. Accordingly, the opinion search engine 60 may remove all of the products having less than 70% positive reviews for its manual. In one implementation, the opinion search engine 60 may determine whether the reviews for each feature of a product include positive or negative reviews based on a calculated opinion score as described above.

Recommending Related Products

The opinion search engine 60 may also identify products that are related to each other. The related products may have similar properties, features and/or components. For example, different products may use a similar memory device in order to store information (i.e., SD memory card). In this example, the different products using similar memory devices may be associated with each other as related products. As such, the opinion search engine 60 may associate a product with one or more other products having the same or similar values of related properties in order to recommend products.

Recommending Competitor Products

The opinion search engine 60 may also recommend competitor products to a user. Here, the opinion search engine 60 may analyze a user's click-through log to identify one or more web pages related to a specific product that a user may have accessed by clicking on a search result. Upon analyzing the click-through log, the opinion search engine 60 may identify one or more competitor products of the product web pages accessed by the user. The opinion search engine 60 may then recommend these competitor products to the user.

In order to determine which products may be competitors to the specific product, the opinion search engine 60 may analyze the click-through log and determine which product web pages were accessed by multiple users as indicated in the multiple users' click-through logs. In one implementation, the opinion search engine 60 may determine that products may be competitors if multiple users access different product websites after performing a query for a specific product or for a generic product category.

Identifying Distinguishing Features of a Product

The opinion search engine 60 may also identify one or more distinguishing features of a product based on the categorized opinion database. The opinion search engine 60 may then display these distinguishing features to a user. In one implementation, the opinion search engine 60 may identify the distinguishing features of a product by analyzing the number of users commenting on the feature, the positive and negative opinion percentages of the user comments on the feature and a differentiation in feature level between each product falling in the same category in the categorized opinion database.

In one implementation, if the number of users commenting on a specific feature is large, the opinion search engine 60 may determine that the specific feature is a distinguishing feature. The opinion search engine 60 may also use the positive and negative opinion percentages of the user comments about the feature to determine whether a feature is distinguishable. Here, if the percentage of positive opinions and the percentage of negative opinions are relatively similar, the opinion search engine 60 may determine that the feature pertaining to the positive and negative opinions is not distinguishable. However, if there is a large difference between the percentage of positive opinions and the percentage of negative opinions pertaining to the product feature, the opinion search engine 60 may determine that the product feature is a distinguishing feature.

The opinion search engine 60 may also use other information pertaining to the product, such as specification information about the product, to determine whether the product includes one or more distinguishing features. In one implementation, the product specification for one product in a product category may indicate that the product costs significantly more than the other products in the same category. Here, the price of the product may be described as a distinguishing feature because of the disparity between the price of the product as compared to prices of similar products. Similarly, if other features provided in a product's specification differ significantly from the features of other products that fall within the same category of the product, the opinion search engine 60 may determine that these differing features may be distinguishing features.

Query Products Based on Positive/Negative Percentage in Features

The opinion search engine 60 may also receive a request from a user to query products based on the positive and negative opinion percentages in features as described above. In this implementation, the opinion search engine 60 may evaluate the percentage of positive opinions and the percentage of negative opinions on each feature to determine whether the feature is a distinguishing feature. The opinion search engine 60 may then list the products according to the products having the highest discrepancy between the percentage of positive opinions and the percentage of negative opinions on the feature.

Compare Products Based on Opinions

The opinion search engine 60 may also display a comparison between two or more products. The comparison between the products may compare the distinguishing features between the two or more products. The opinion search engine 60 may identify the distinguishing features according to the method for identifying distinguishing features of a product as described above.

Display and Compare Opinion Trend

The opinion search engine 60 may also organize opinion data according its trend. Here, the opinion search engine 60 may evaluate the trend of the opinion data or reviews for a particular product or a product feature over a period of time. In one implementation, if the number of opinions pertaining to the product or the product feature is increasing, the opinion search engine 60 may display an arrow pointing up next to the corresponding product or product feature to indicate that the trend for the corresponding opinion data about the product or product feature is rising. If, however, the number of opinions pertaining to the product or the product feature is decreasing, the opinion search engine 60 may display an arrow pointing down next to the corresponding product or product feature to indicate that the trend for the corresponding opinion data about the product or product feature is falling.

Figure 3:
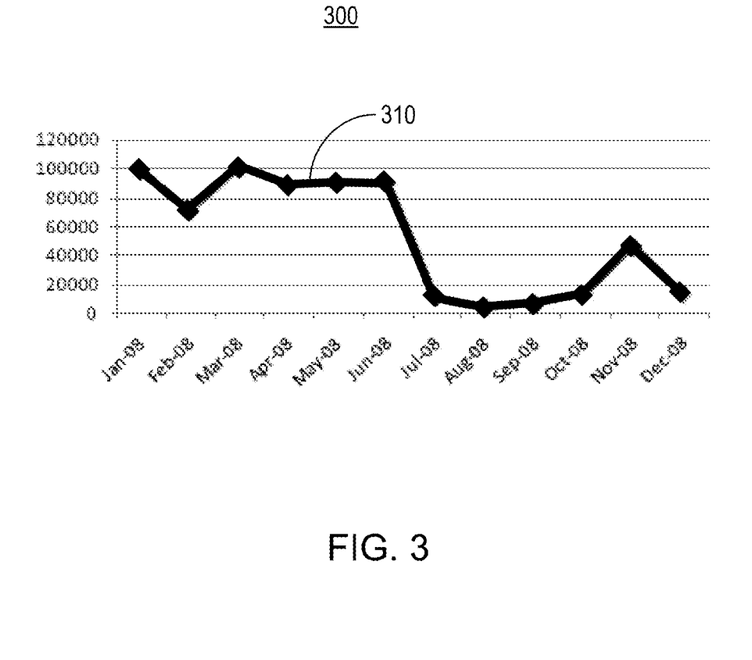
FIG. 3 illustrates a graph of a trend of opinion data for a single product in accordance with one or more implementations of various techniques described herein.

The opinion search engine 60 may also display the trend of the opinion data for a single product over a period of time on a graph as shown in FIG. 3. FIG. 3 illustrates the trend of the opinion data over a time period of one year. As such, the total number of opinions for each month during one year is illustrated on the graph 300. The trend of the total number of opinions represented by the line 310. In addition to displaying the trend of the opinion data for a single product, the opinion search engine 60 may compare the trend of the opinion data over a period of time for multiple products. In this manner, the opinion data trend for each of the multiple products may be represented by different lines on a graph similar to that as illustrated in FIG. 3.

View Opinion Change Data

Figure 4:
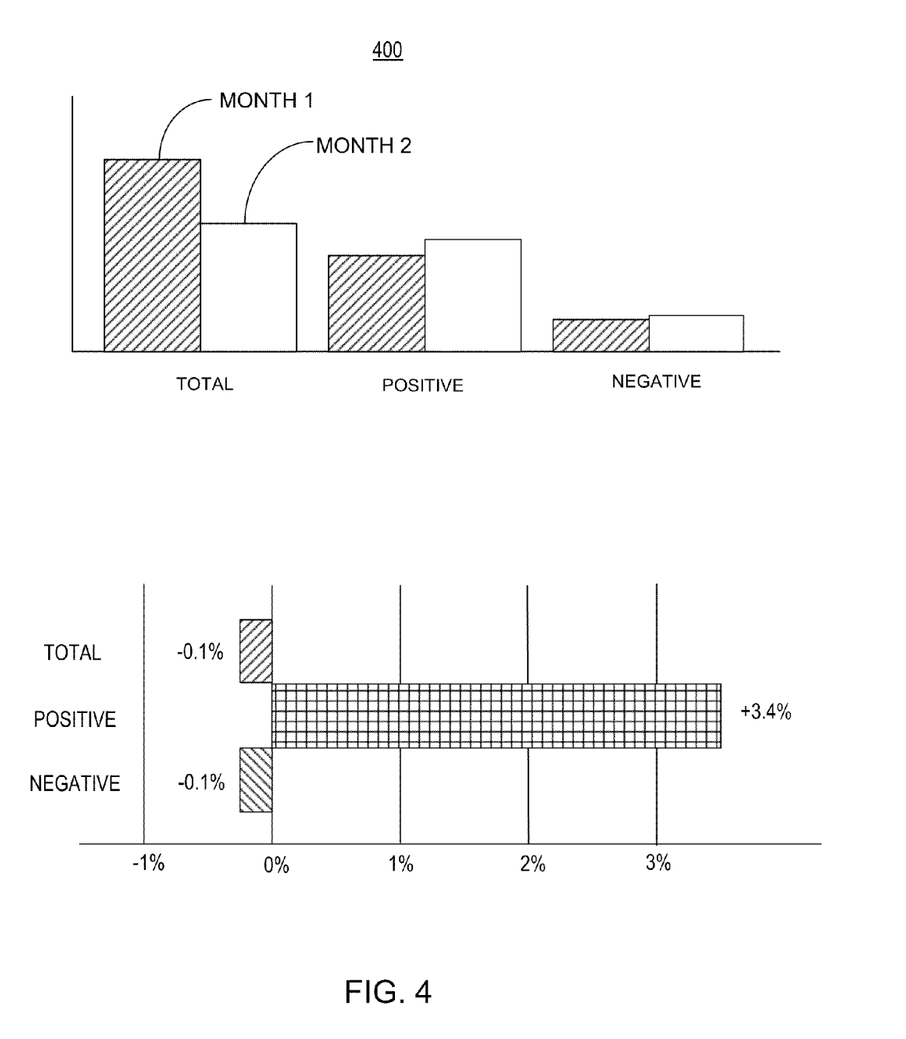
FIG. 4 illustrates graphs of opinion change data for a single product in accordance with one or more implementations of various techniques described herein.

The opinion search engine 60 may determine the volume of change in the number of user comments for a product, the number of positive comments for a product, the number of negative comments for a product, the percentage of user comments for a product, the percentage of positive comments for a product, the percentage of negative comments for a product and the like. The opinion search engine 60 may determine the change with respect to a time period (e.g., week, month) as defined by a user. After determining the change in the various types of comments for a product, the opinion search engine 60 may display the opinion change data to the user. FIG. 4 illustrates the opinion data change in volume and percentage from Month 1 to Month 2. The opinion search engine 60 may also display the opinion data change information for multiple products on the same graph. In addition to determining the opinion change data for a product, the opinion search engine 60 may also determine the opinion change data for features of a product.

Rank Opinion Data

The opinion search engine 60 may also rank the opinion data that a user has added on the Internet. In one implementation, the opinion search engine 60 may rank the opinion data based on an overall ranking algorithm. The overall ranking algorithm may consider the quality of the opinion data, the authority of the user expressing the opinion, the authority of the website from which the opinion was obtained and the like in ranking the opinion data. The opinion search engine 60 may also rank opinion data based on feature ranking algorithm. The feature ranking algorithm may rank the opinion data based on the same information considered by the overall ranking algorithm along with information pertaining to how much of the opinion data is about a feature of interest. The feature of interest may be defined by the user performing a search of opinion data on the opinion search engine 60.

Generate Demographic Statistics of Opinion Data

The opinion search engine 60 may also generate demographic statistics of the opinion data. The demographic statistics may include location, gender, age etc. of the user who added the opinion data. The opinion search engine 60 may provide the demographic details of the opinion data to its users. The opinion search engine 60 may also provide opinion data search results based on the similarities between demographic details of the opinion data and the demographic details of the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a processing unit of a computing system, the method comprising:
    collecting opinion data about a user-specified product category of interest from multiple different opinion-providing webpages having different link paths;
    extracting metadata about the opinion data from the opinion data;
    evaluating the different link paths of the different opinion-providing webpages to determine product category taxonomies of the different opinion-providing webpages;
    determining that a first link path of a first opinion-providing webpage uses a first term to refer to a specific product category and a second link path of a second opinion-providing webpage uses a second term to refer to the specific product category;
    creating a product category taxonomy of hierarchical product categories that includes the specific product category;
    categorizing the metadata according to the hierarchical categories of the product category taxonomy; and
    ranking different products discussed in the opinion data based at least on the categorized metadata.

2. A method implemented by a processing unit of a computing system, the method comprising:
    collecting opinion data from one or more networks, the opinion data reflecting opinions about a product; and
    determining a brand name of the product using a finite state machine comprising multiple state sequences reflecting product names, wherein the determining the brand name further comprises:
        creating the finite state machine such that the finite state machine accepts other products but not the product,
        finding modifications to the finite state machine that cause the finite state machine to accept the product, and
        updating the finite state machine with the modifications such that the finite state machine accepts the product.

3. The method of claim 2, further comprising:
    finding a minimal set of modifications to the finite state machine that will accept the product,
    the updating comprising applying the minimal set of modifications to the finite state machine.

4. A computer system, comprising:
    at least one processing unit; and
    at least one memory comprising program instructions executable by the at least one processing unit, wherein the program instructions, when executed by the at least one processing unit, cause the at least one processing unit to:
    receive, from a user, a user-specified product category of interest;
    collect opinion data that discusses multiple products from the user-specified product category of interest from multiple different opinion-providing websites having different site maps;
    extract opinion metadata from the opinion data, the opinion metadata relating to the multiple products discussed on the multiple different opinion-providing websites;
    based at least on the different site maps of the different opinion-providing websites, determine a product category taxonomy for the multiple products;
    organize the opinion metadata according to the product category taxonomy; and
    evaluate the multiple products based at least on the organized opinion metadata.

5. The system of claim 4, wherein the multiple different opinion-providing websites include:
    a blog,
    a forum, and
    a newsgroup.

6. The system of claim 4, wherein the program instructions further cause the at least one processing unit to:
    determine that a first user of a first opinion-providing website referred to a manufacturer's name and version number of a specific product in an individual first review; and
    determine that a second user of a second opinion-providing website also refers to the specific product in an individual second review that does not mention the manufacturer's name and does not mention the version number.

7. The system of claim 4, wherein the program instructions further cause the at least one processing unit to:
    determine hotness scores for the multiple products by:
        determining a number of query requests relating to individual products made by various other users to an Internet search engine, and
        identifying certain web pages that the various users clicked after receiving Internet search results relating to the individual products from the Internet search engine,
    wherein the individual products are evaluated by the system based at least on the hotness scores.

8. The system of claim 4, wherein the program instructions further cause the at least one processing unit to:
determine a hotness score for an individual product by:
determining a number of reviews concerning the individual product that were added to an individual opinion-providing website during a certain time period,
determining another number of subsequent reviews concerning the individual product that were added to the individual opinion-providing website during a subsequent time period after the certain time period, and
determining a trend in numbers of reviews for the individual product based on the number of reviews and the another number of subsequent reviews added to the individual opinion-providing website,
wherein the individual product is evaluated by the system based at least on the hotness score.

9. The system of claim 4, wherein the program instructions further cause the at least one processing unit to:
determine a hotness score for an individual product by:
determining a number of reviewers that have reviewed the individual product on an individual opinion-providing website, and
determining demographic information of the reviewers, including at least:
genders of the reviewers,
age of the reviewers, and
location of the reviewers,
wherein the individual product is evaluated by the system based at least on the hotness score.

10. The system of claim 4, wherein the program instructions further cause the at least one processing unit to:
determine a unified opinion score for an individual product that was reviewed on the multiple different opinion-providing websites by:
determining different rating scores given to the individual product by different users of the multiple different opinion-providing websites, and
combining the different rating scores to determine the unified opinion score,
wherein the individual product is evaluated by the system based at least on the unified opinion score.

11. The system of claim 10, wherein the program instructions further cause the at least one processing unit to:
determine the unified opinion score based at least on a total number of users that provided reviews about the another individual product.

12. The system of claim 10, wherein the program instructions further cause the at least one processing unit to:
distinguish between the multiple different users to identify an editor of an individual opinion-providing website, a product specialist that submitted a review to the individual opinion-providing website, and other reviewing users; and
accord different levels of authority to the editor, the product specialist, and the other reviewing users when determining the unified opinion score.

13. The system of claim 4, wherein the program instructions further cause the at least one processing unit to:
determine a total number of positive reviews and a total number of negative reviews for an individual product that was reviewed on the multiple different opinion-providing websites; and
and
rank the individual product relative to other products based at least on the total number of positive reviews for the individual product and the total number of negative reviews for the individual product.

14. The system of claim 4, wherein the program instructions further cause the at least one processing unit to:
receive a user-specified percentage of positive reviews for one or more specific user-reviewed product features that have been reviewed by various users for the multiple products; and
remove certain products that do not meet the user-specified percentage of positive reviews for the one or more specific user-reviewed product features to obtain filtered products.

15. The system of claim 14, wherein the one or more specific user-reviewed product features include:
a user manual of the multiple products,
noise of the multiple products,
resolution of the multiple products, and
weight of the multiple products.

16. The system of claim 4, wherein the program instructions further cause the at least one processing unit to:
analyze a click-through log of the user to identify a specific product that the user has clicked on;
analyze other click-through logs of other users to identify competitor products of the specific product that the other users have searched for after querying for the specific product; and
recommend the competitor products to the user.

17. The system of claim 4, wherein the program instructions further cause the at least one processing unit to:
discern between various user-reviewed product features of an individual product to identify a distinguishing user-reviewed product feature of the individual product and non-distinguishing user-reviewed product features of the individual product; and
rank the individual product relative to other products based at least on the distinguishing user-reviewed product feature.

18. The system of claim 17, wherein the program instructions further cause the at least one processing unit to identify the distinguishing user-reviewed product feature by:
determining that a percentage of positive reviews about the distinguishing user-reviewed product feature exceeds a percentage of negative reviews about the distinguishing user-reviewed product feature by a predetermined value.

19. The system of claim 17, wherein the program instructions further cause the at least one processing unit to:
determine a number of opinion words present in a plurality of different webpages; and
when the number of opinion words in an individual webpage exceeds a threshold, designate the individual webpage as an opinion-providing webpage.

* * * * *